US008141065B2

(12) United States Patent
Shamilian et al.

(10) Patent No.: US 8,141,065 B2
(45) Date of Patent: Mar. 20, 2012

(54) METHOD AND APPARATUS FOR PERFORMING NON SERVICE AFFECTING SOFTWARE UPGRADES IN PLACE

(75) Inventors: John H. Shamilian, Tinton Falls, NJ (US); Thomas L. Wood, Colts Neck, NJ (US)

(73) Assignee: Alcatel Lucent, Paris (FR)

( * ) Notice: Subject to any disclaimer, the term of this patent is extended or adjusted under 35 U.S.C. 154(b) by 1194 days.

(21) Appl. No.: 11/862,836

(22) Filed: Sep. 27, 2007

(65) Prior Publication Data
US 2009/0089770 A1    Apr. 2, 2009

(51) Int. Cl.
*G06F 9/44*      (2006.01)
*G06F 9/45*      (2006.01)
*G06F 9/445*     (2006.01)
*G01R 31/08*     (2006.01)

(52) U.S. Cl. ........ 717/157; 717/113; 717/168; 717/174; 370/230; 370/235

(58) Field of Classification Search .......................... None
See application file for complete search history.

(56) References Cited

U.S. PATENT DOCUMENTS

| | | | |
|---|---|---|---|
| 7,376,945 B1* | 5/2008 | Kakumani et al. | 717/171 |
| 7,461,374 B1* | 12/2008 | Balint et al. | 717/174 |
| 7,536,676 B2* | 5/2009 | Baker et al. | 717/113 |
| 7,869,363 B2* | 1/2011 | Shamilian et al. | 370/235 |
| 2002/0083314 A1* | 6/2002 | Uyttendaele et al. | 713/1 |
| 2005/0102615 A1* | 5/2005 | Roman et al. | 715/513 |
| 2005/0132350 A1* | 6/2005 | Markley et al. | 717/168 |
| 2008/0288931 A1* | 11/2008 | Kohli | 717/157 |
| 2009/0085916 A1 | 4/2009 | Shamilian et al. | |
| 2009/0219814 A1* | 9/2009 | Shamilian et al. | 370/235 |
| 2009/0296573 A1* | 12/2009 | Shamilian et al. | 370/230 |

OTHER PUBLICATIONS

"Non-Service Affecting Software Upgrades for Multi-Service Routers", Antti Kankkunen, 2005 IEEE, pp. 295-300; <http://ieeexplore.ieee.org/search/searchresult.jsp?newsearch=true&queryText=non-service+affecting+software+upgrades>.*
"Implementing On-line Software Upgrades in Java", Martha Gebremichael, May 2003, University of Maryland, College Park, pp. 1-21; <http://www.google.com/#q=runtime+software+upgrading>.*
"Practical Dynamic Software Updating for C", Michael Hicks, 2006 ACM, pp. 72-83 <http://dl.acm.org/results.cfm?h=1&cfid=68073395&cftoken=48520821>.*

* cited by examiner

*Primary Examiner* — Thuy Dao
*Assistant Examiner* — Ben Wang
(74) *Attorney, Agent, or Firm* — Wall & Tong, LLP

(57) ABSTRACT

The invention includes a method and apparatus for dynamically defining and instantiating an undefined portion of a graph, where the graph has a plurality of states and a plurality of state transitions. A method includes executing the graph where the graph comprises a defined portion and an undefined portion and a plurality of tokens traverse the graph executing functions, suspending the one of the tokens in response to the one of the tokens detecting the undefined portion of the graph, generating a new portion of the graph for the undefined portion of the graph, replacing the undefined portion of the graph with the new portion of the graph, and releasing the suspended token. The new portion of the graph is generated by generating at least one definition file for the undefined portion of the graph and executing the at least one definition file to form thereby the new portion of the graph. The at least one definition file is generated by obtaining information adapted for defining the undefined portion of the graph and generating the at least one definition file using the obtained information.

17 Claims, 7 Drawing Sheets

206

METHOD AND APPARATUS FOR PERFORMING NON SERVICE AFFECTING SOFTWARE UPGRADES IN PLACE

FIELD OF THE INVENTION

The invention relates to the field of software applications and, more specifically, to performing upgrades of software applications.

BACKGROUND OF THE INVENTION

Software applications, such as Voice-Over-IP (VoIP) call control as performed by a VoIP Media Gateway Controller (MGC), have been realized using an approach in which a high-level language is used to describe the data processing and message exchange behavior of the VoIP MGC. In a VoIP MGC, an execution engine accepts a high-level graph language file that is used by the execution engine to create internal data structures which realize the behaviors described in the input language file. The combination of the execution engine and the high-level graph language file (which describes the VoIP MGC behavior) results in a system that exhibits the desired VoIP MGC processing characteristics.

In many such software applications, the software application must be fully defined and implemented before the software application is deployed to the field. For example, each of the functions to be performed by the software application must be fully defined and implemented before deploying the software application to the field. Disadvantageously, this requirement often results in delayed deployment of software applications because additional time is required to define and implement the numerous functions of the software application, thereby resulting in delayed availability of functions and services for use by customers.

SUMMARY OF THE INVENTION

Various deficiencies in the prior art are addressed through the invention of a method and apparatus for dynamically defining and instantiating an undefined portion of a graph, where the graph has a plurality of states and a plurality of state transitions. A method includes executing the graph where the graph comprises a defined portion and an undefined portion and a plurality of tokens traverse the graph executing functions, suspending the one of the tokens in response to the one of the tokens detecting the undefined portion of the graph, generating a new portion of the graph for the undefined portion of the graph, replacing the undefined portion of the graph with the new portion of the graph, and releasing the suspended token. The new portion of the graph is generated by generating at least one definition file for the undefined portion of the graph and executing the at least one definition file to form thereby the new portion of the graph. The at least one definition file is generated by obtaining information adapted for defining the undefined portion of the graph and generating the at least one definition file using the obtained information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables undefined portions of software to be defined and instantiated, in place, without requiring the software to be stopped and restarted, thereby enabling existing, defined portions of software that are not being updated to continue to function while the undefined portions of software are being defined and instantiated. The present invention enables an undefined portion of an instantiated graph to be dynamically defined and instantiated while existing defined portions of the graph continue running. Although primarily depicted and described herein within the context of updating a VoIP call control element software application, the present invention is applicable to any software constructed using a graph language.

Figure 1:
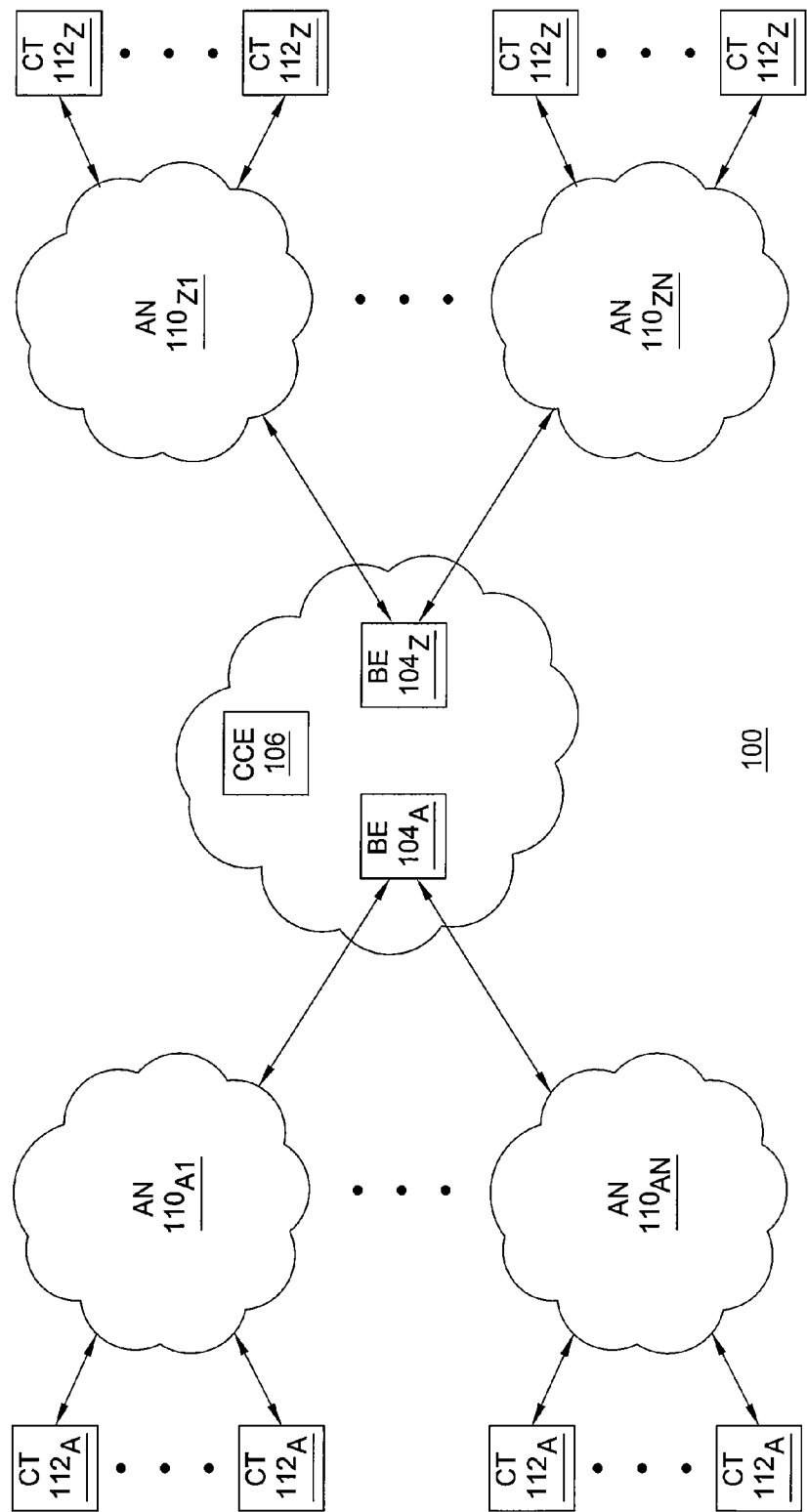
FIG. 1 depicts a high-level block diagram of a communication network.

FIG. 1 depicts a high-level block diagram of a communication network. Specifically, communication network 100 of FIG. 1 includes a core VoIP network 102, a plurality of access networks (ANs) $110_{A1}$-$110_{AN}$ and $110_{Z1}$-$110_{ZN}$ (collectively, ANs 110), and a plurality of customer terminals (CTs) $112_A$ and $112_Z$ (collectively, CTs 112). The core VoIP network 102 includes a plurality of border elements (BEs) $104_A$ and $104_Z$ (collectively, BEs 104) and a call control element (CCE) 106. The core VoIP network 102 (including BEs 104 and CCE 106) and ANs 110 cooperate to provide end-to-end VoIP services to CTs 112. The core IP network 102 communicates with ANs 110 (via BEs 104) using various communication paths. The ANs 110 communicate with CTs 112 using various communication paths.

The core VoIP network 102 supports VoIP services. The BEs 104, which reside at the edge of core VoIP network 102, interface with CTs 112 over ANs 110. The BEs 104 perform signaling, call admission control, media control, security, and like functions, as well as various combinations thereof. For example, BEs 104 may be Media Gateways, VoIP Gateways, and the like, as well as various combinations thereof. The CCE 106 resides within core VoIP network 102. The CCE 106 interacts with BEs 104, as well as other components of core IP network 102, to provide VoIP-related functions and services, e.g., performing network wide call-control related functions as well as interacting with VoIP service related servers (e.g., media servers, application servers, and the like) as necessary. For example, CCE 106 may be a Media Gateway Controller (MGC), a softswitch, and the like (and may also be referred to as a call agent). The CCE 106 and BEs 104 may communicate using various protocols, such as Media Gateway Control Protocol (MGCP), Simple Gateway Control Protocol (SGCP), Megago (i.e., H.248), Session Initiation Protocol (SIP), H.323, and the like. Although primarily depicted and described herein with respect to a specific core network, the present invention is independent of the type of core network.

The ANs 110 may be packet-based ANs, (Time Division Multiplexing) TDM-based ANs, and the like, as well as various combinations thereof. A TDM-based access network may be used to support TDM-based customer terminals, such as customer endpoint devices connected via traditional telephone lines. For example, a TDM-based access network may be the Public Switched Telephone Network (PSTN). A packet-based access network may be used to support IP-based customer endpoint devices and/or TDM-based customer endpoint devices. For example, a packet-based access network may be based on one or more of IP, Ethernet, Frame Relay (FR), Asynchronous Transfer Mode (ATM), and the like, as well as various combinations thereof. A packet-based access network (e.g., such as a cable network, Digital Subscriber Line (DSL) network, and the like) may include a terminal adapter (TA) such that the packet-based access network can support TDM-based customer endpoint devices. Although primarily depicted and described herein with respect to specific types of access networks, the present invention is independent of the type of access network.

The CTs 112 may be packet-based CTs, TDM-based CTs, and the like, as well as various combinations thereof. The CTs 112 may be customer network elements and/or customer endpoint devices. With respect to packet-based CTs, for example, CTs 112 may include customer network elements, such as VoIP gateways, VoIP routers, IP-PBXs (Internet Protocol-Private Branch Exchange), and like customer network elements supporting IP-based customer endpoint devices such as computers, IP phones, and the like, as well as various combinations thereof. With respect to TDM-based CTs, for example, CTs 112 may include TDM-PBXs (Time Division Multiplexing-Private Branch Exchange), TAs (which provide interworking functions between TDM-based customer endpoint devices and the core IP network), and like customer network elements supporting TDM-based customer endpoint devices such as analog phones. Although primarily depicted and described herein with respect to specific types of customer terminals, the present invention is independent of the type of customer terminals supported.

Although omitted for purposes of clarity, core VoIP network 102 may include various other VoIP components, such as core elements (CEs), Media Servers (MSs), VoIP-related Application Servers (ASs), and the like, as well as various combinations thereof. Although omitted for purposes of clarity, each of the ANs 110 may include various components depending on the type of access network and the type of customer terminals being supported (e.g., such as IP-PBXs, TAs, TDM-PBXs, routers, and the like, as well as various combinations thereof). In other words, communication network 100 is merely provided for purposes of describing the present invention within the context of one of many possible applications of the present invention. The present invention may be used to provide software upgrades in place for any software capable of being controlled in accordance with the present invention.

As described herein, communication network 100 enables VoIP calls to be established between CTs 112. A call scenario is now described In order to illustrate the operation of communication network 100 in completing a VoIP call between CTs (e.g., one of the CTs $112_A$ and one of the CTs $112_Z$). A customer using CT $112_A$ (calling party) initiates a call to a customer using CT $112_Z$ (called party). A call setup signaling message is sent from CT $112_A$ to BE $104_A$, which sends a call setup signaling message to CCE 106. The CCE 106 examines the called party information and queries one or more VoIP service ASs to obtain information necessary to complete the call. Upon determining that BE $104_Z$ must be involved in completing the call, CCE 106 sends another call setup signaling message to BE $104_Z$, which forwards the call signaling setup message to CT $112_Z$. If the call is accepted by the called party, a call acknowledgement signaling message is sent from CT $112_Z$ to CCE 106 via BE $104_Z$. Upon receiving the call acknowledgement message, CE 106 sends a call acknowledgement signaling message toward the calling party and, further, provides information associated with the call to BEs $104_A$ and $104_Z$ (so that the call data exchange proceeds directly between BEs $104_A$ and $104_Z$).

As such, CCE 106 supports call flows adapted to handle signaling required to complete calls between CTs 112. The call flows supported by CCE 106 are provided using call flow software implemented on CCE 106. As networks and services evolve, the set of call flows that must be supported by CCE 106 changes, requiring updates to various portions of the software implemented on CCE 106. Disadvantageously, in existing networks, updates to portions of the software implemented on CCE 106 require all software implemented on CCE 106 to be stopped and restarted, thus requiring the network operator to either (1) accept network downtime during the software upgrade or (2) switch service from CCE 106 to a redundant CCE (omitted for purposes of clarity) in order to continue to provide call control functions during the software upgrade. The present invention advantageously enables portions of the software implemented on CCE 106 to be upgraded in place, thereby enabling unaffected portions of the software to continue to run on CCE 106 during the software upgrade. The operation of the present invention in performing software upgrades in place may be better understood with respect to FIGS. 2-8.

Figure 2:
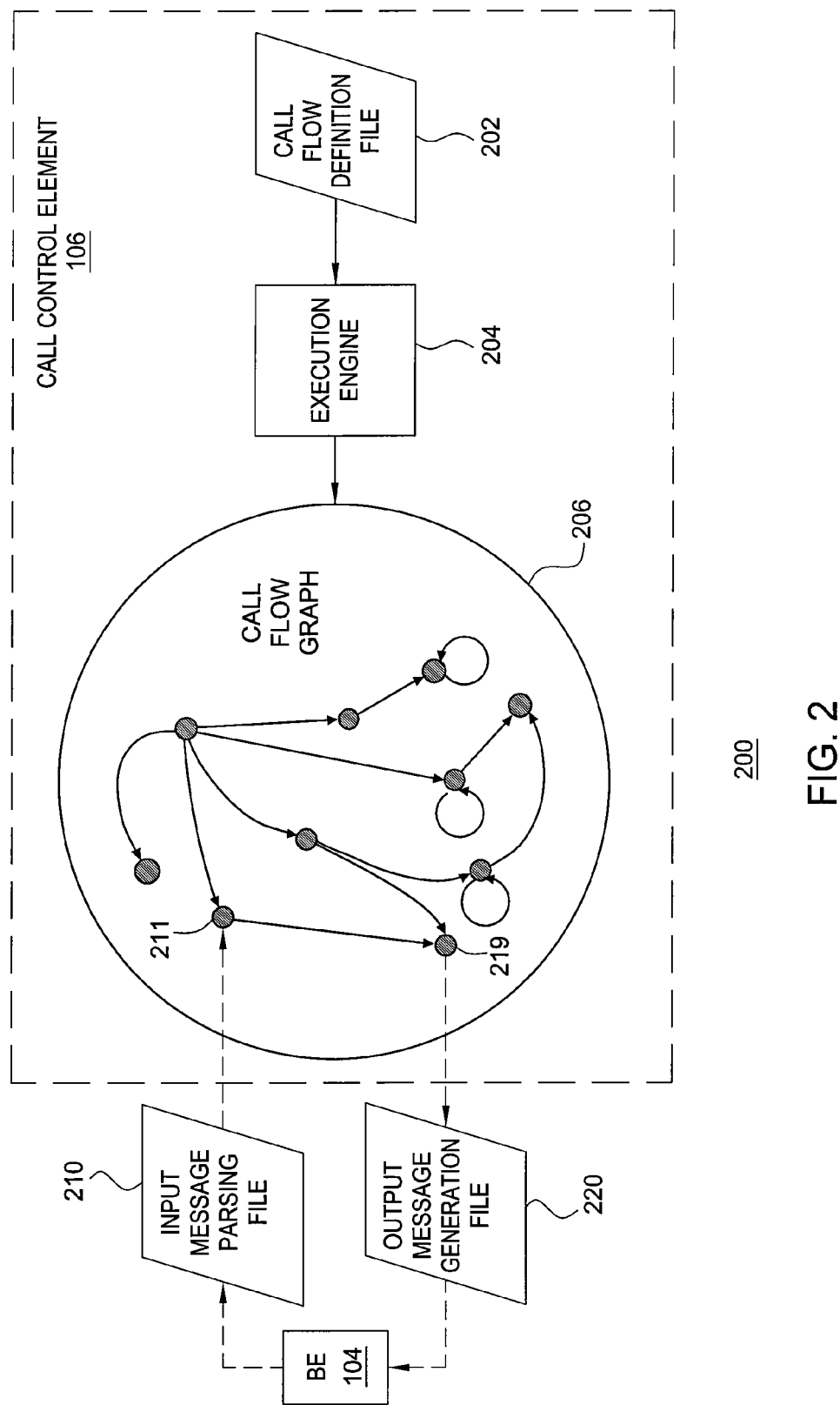
FIG. 2 depicts a high-level block diagram of interaction between the call control element and border element of the communication network of FIG. 1.

FIG. 2 depicts a high-level block diagram of interaction between the call control element and border element of the communication network of FIG. 1. As depicted in FIG. 2, a call flow definition file 202 is read into an execution engine 204 producing a call flow graph 206 (which may be more generally referred to herein as a call flow). The call flow definition file 202 explicitly defines the call flow in terms of states, state transitions, message translations, and the like. The execution engine 204 reads in the call flow definition file 202, processing the call flow definition file to produce call flow graph 206. The call flow graph 206 is software, including internal data structures, that runs on CCE 106 to realize the behaviors (e.g., functions and services), as described in call flow definition file 202, that need to be supported by CCE 106.

The execution engine 204 is adapted to perform various functions of the present invention such that an undefined portion of an instantiated graph may be detected and, upon being detected, may be defined and instantiated within the graph while the existing defined portions of the instantiated graph continue running. In other words, execution engine 204 is adapted to enable software to be defined and instantiated within a functioning system on-the-fly (i.e., while the other portions of the software that were previously defined and instantiated continue running to provide various functions. The execution engine 204 is adapted to define an undefined portion of a graph, to form thereby a new portion of the graph, and to replace the undefined portion of the graph with the new portion of the graph while the previously defined portions of the continue running. The execution engine 204 is adapted to perform various other functions associated with the present invention.

As depicted in FIG. 2, which depicts an example of a function that may be provided by CCE 106 using call flow

206, CCE 106 receives an input message parsing file 210 from BE 104 (e.g., as part of a VoIP control message). The CCE 106 processes the input message parsing file 210 using call flow graph 206. Specifically, input message parsing file 210 initializes a portion of the call flow graph 206 to an entry state (illustratively, state 211), from which call flow graph 206 transitions to an exit state (illustratively, state 219), thereby causing CCE 106 to generate an output message generation file 220 in response to the input message parsing file 210. The CCE 106 transmits the output message generation file 220 to BE 104 (e.g., as part of a VoIP control message). Thus, call flow graph 206 instantiated by CCE 106 using call flow definition file 202 enables CCE 106 to provide various functions and services. The operation of call flow graph 206 may be better understood with respect to FIG. 3. The operation of execution engine 204 in defining and instantiating an undefined portion of a graph may be better understood with respect to FIG. 4-FIG. 6.

Figure 3:
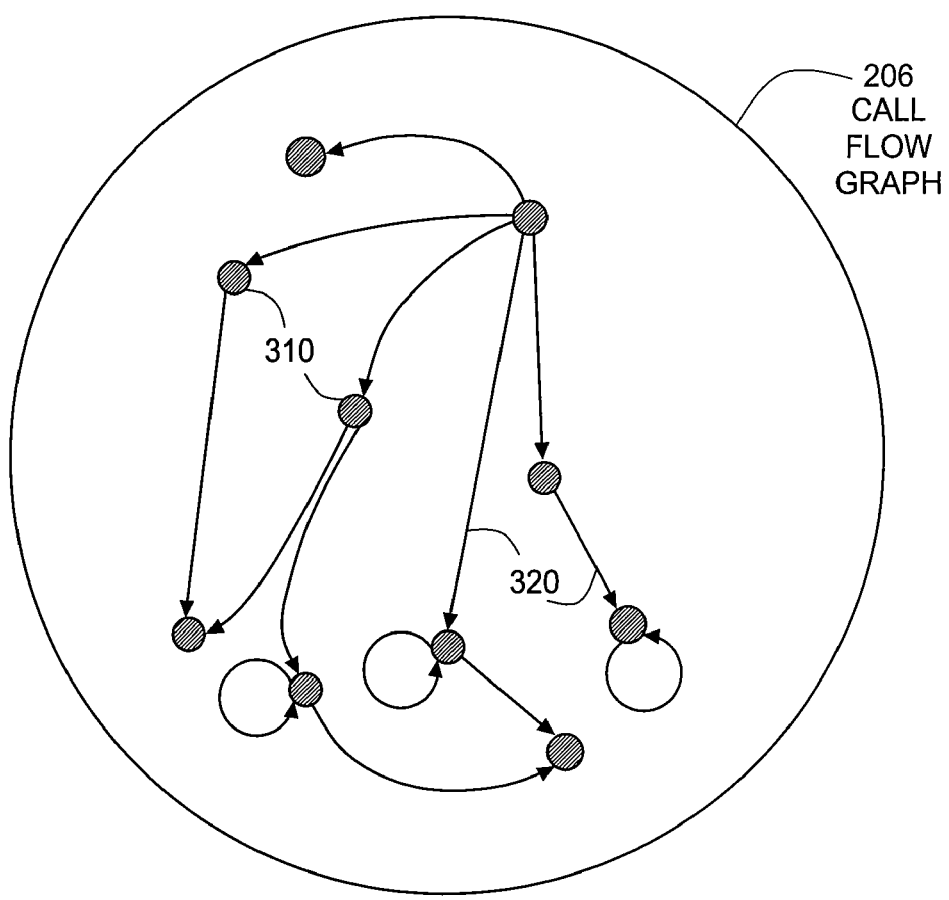
FIG. 3 depicts the call flow graph depicted and described with respect to FIG. 2.

FIG. 3 depicts the call flow graph depicted and described with respect to FIG. 2. Specifically, call flow graph 206 is a graphical representation of call flow software. The call flow graph 206 includes a plurality of states 310 (collectively, states 310) and a plurality of state transitions 320 (collectively, state transitions 320). A multiplicity of tokens circulates within call flow graph 206, executing one or more functions during each of the state transitions 320 between states 310. For example, transition functions may include functions such as parsing incoming messages (e.g., from external devices, from other tokens, and the like), sending outgoing messages (e.g., to external devices, to other tokens, and the like), and the like, as well as various combinations thereof.

A graph may include one or more graph regions. A graph region is a set of one or more graph functions. A graph function is a function invoked at an entry state (e.g., using a "graph call" function), in which control is passed back to the entry state, rather than to an arbitrary next state, such that there is a set of states that are partitionable from other graph functions of the graph (i.e., partitionable starting with the entry state and including all states up to and including the state that uses a "graph return" to send control back to the entry state). For purposes of clarity, the state transitions from return states to entry states (i.e., graph returns) are omitted from FIG. 3.

As such, a graph function includes an entry state and a returning state (which, for some functions, may be the same state as the entry state), and, optionally, one or more intermediate states. In other words, a graph function includes one or more states (i.e., a graph function may, in some instances, consist of a single state). The operation of a graph function may be better understood with respect to FIG. 4, which depicts an exemplary graph function which may be representative of any graph function of the call flow graph of FIG. 3 or any other graph composed of graph functions.

Figure 4:
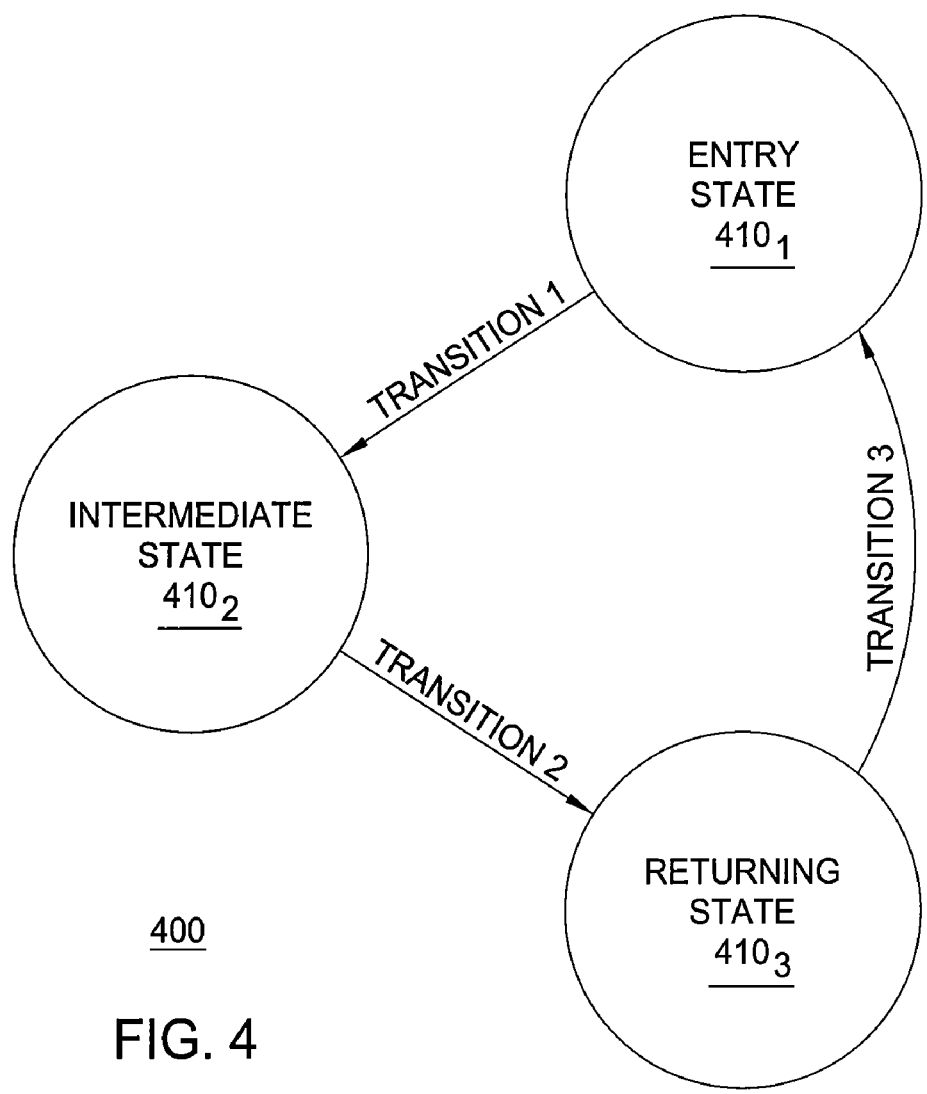
FIG. 4 depicts an exemplary graph function.

FIG. 4 depicts an exemplary graph function. As depicted in FIG. 4, graph function 400 of FIG. 4 includes an entry state $410_1$, an intermediate state $410_2$, and a returning state $410_3$. The graph function 400 is entered at entry state $410_1$. The "graph call" method invoked at entry state $410_1$ pushes its own state number onto the graph stack (for use later by the "graph return" method invoked by the returning state $410_3$). As graph function 400 executes, graph function 400 transitions from entry state $410_1$ to intermediate state $410_2$ (denoted as transition 1), transitions from intermediate state $410_2$ to returning state $410_3$ (denoted as transition 2), and transitions from returning state $410_3$ to entry state $410_1$ (denoted as transition 3). The "graph return" method invoked at returning state $410_3$ pulls the next state from the graph stack.

As described herein, a graph region may include one or more graph functions, and each graph function is a set of states and associated state transitions that are partitionable from other graph functions of the graph. Thus, an incomplete graph may be instantiated such that the graph includes defined portions and undefined portions. The defined portions of the graph may be executed to provide various functions, even though the graph includes one or more undefined portions that have not yet been defined. The undefined portions of the graph may be defined and instantiated on-the-fly while the defined portions continue running. A graph including defined portions and undefined portions is depicted and described herein with respect to FIG. 5.

Figure 5:
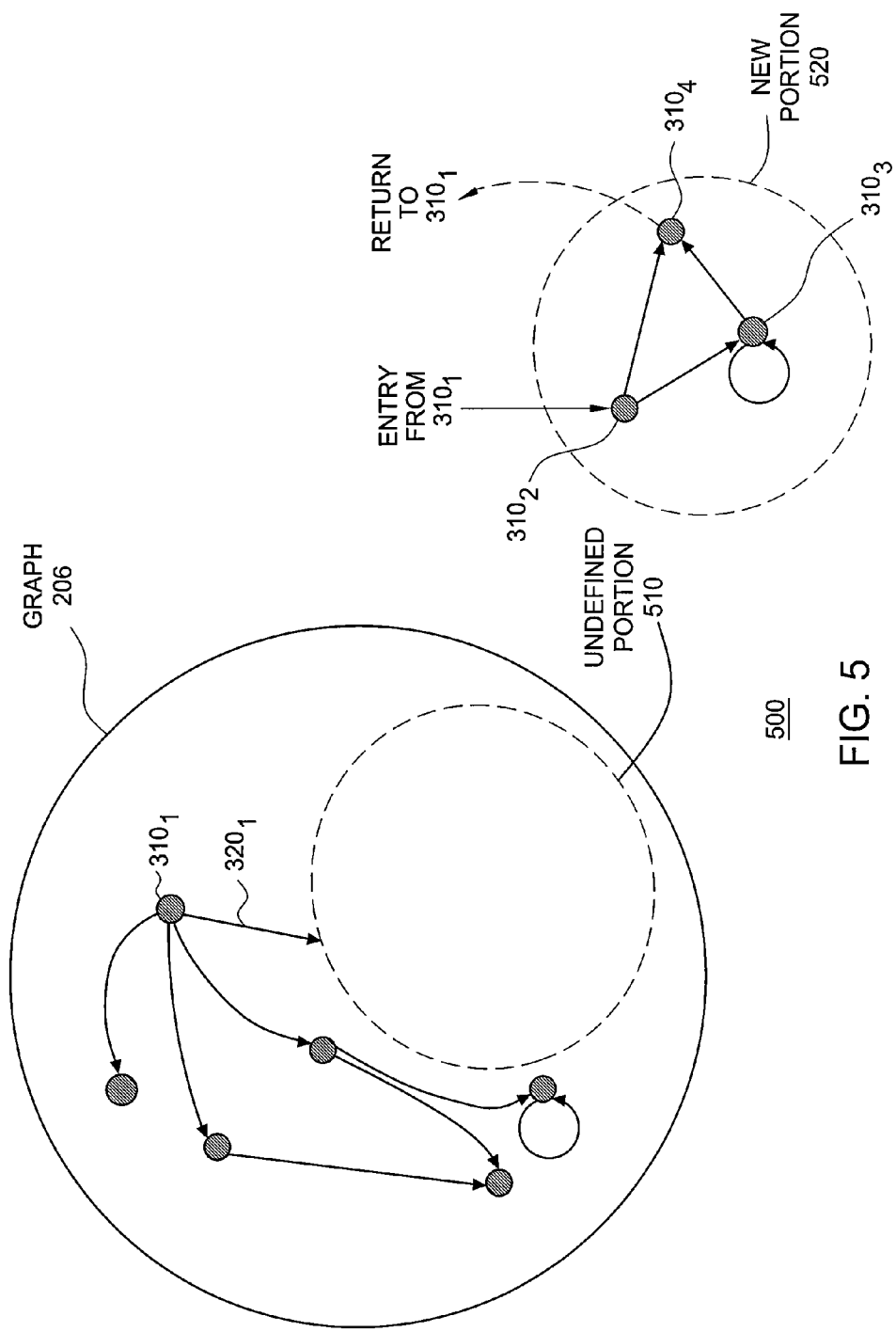
FIG. 5 depicts a graph including defined portions and undefined portions.

FIG. 5 depicts a graph including defined portions and undefined portions. As depicted in FIG. 5, a portion of call flow graph 206 is undefined (denoted as undefined portion 510), which the remaining portions of call flow graph 206 are defined. The defined portions of call flow graph 206 include a state (denoted as state $310_1$) which has an undefined state transition (denoted as state transition $320_1$). The state transition $320_1$ is a transition from defined state $310_1$, however, there is no corresponding state to which a transition may be made (i.e., the state transition $320_1$ has not yet been defined and, thus, is associated with undefined portion 510 of call flow graph 206). Thus, a token preparing to traverse the undefined state transition $320_1$ may not make such a transition because the next state is undefined.

Using the present invention, in response to the token detecting the undefined portion 510 of the call flow graph 206 (i.e., detecting that there is no state to which a transition may be made along state transition $320_1$), the token is suspended, and the undefined portion 510 of call flow graph 206 is defined to form a new portion of the graph (denoted as new portion 520). As depicted in FIG. 5, new portion 520 includes a plurality of states (states $310_2$, $310_3$, and $310_4$) and state transitions adapted to perform various functions. In other words, functionality that was not previously instantiated, but which is now required, is defined and instantiated on-the-fly as needed. A method for dynamically defining and instantiating an undefined portion of an instantiated graph, while the defined portions of the graph continue running, is depicted and described herein with respect to FIG. 6.

Figure 6:
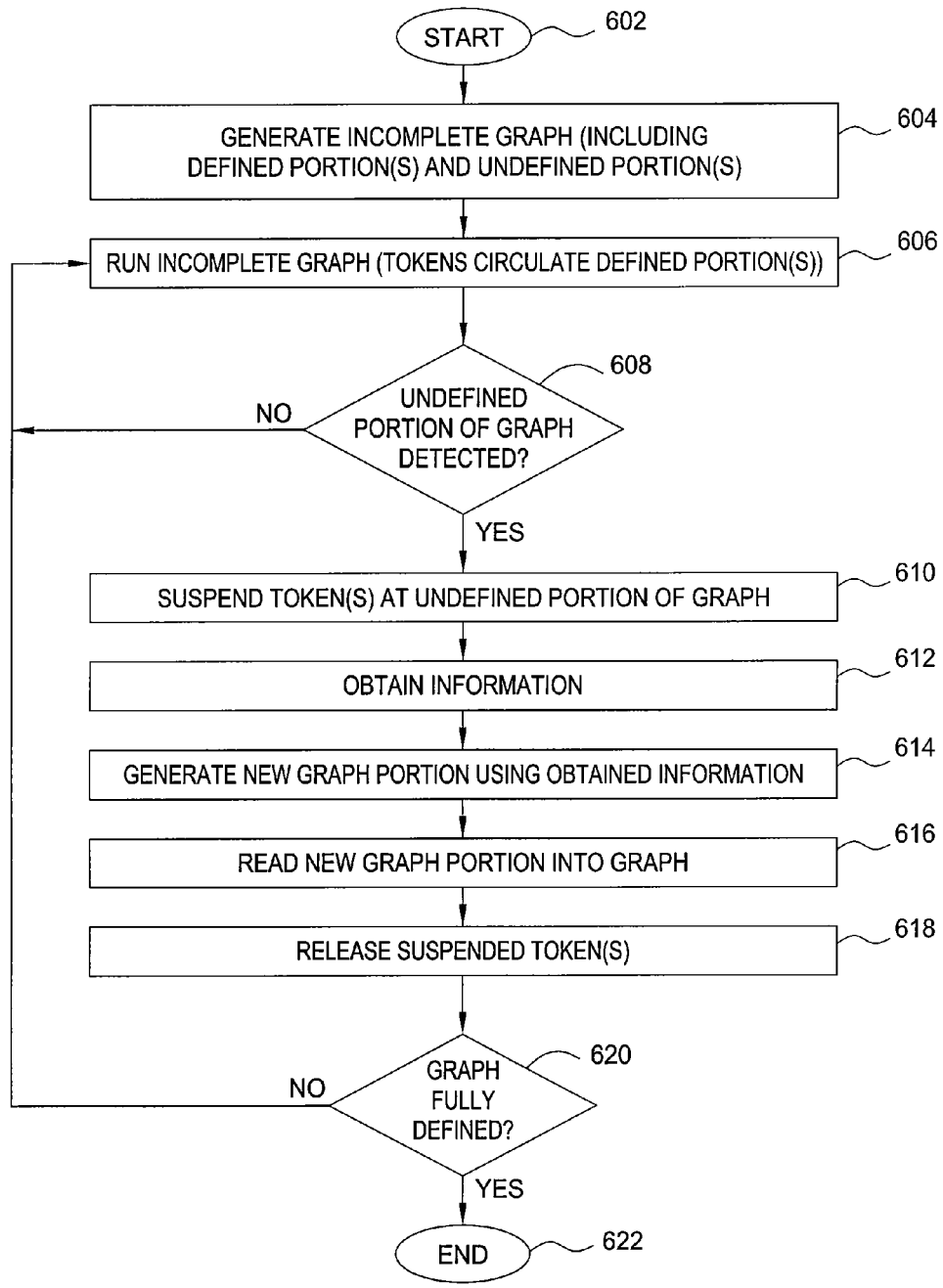
FIG. 6 depicts a method according to one embodiment of the present invention.

FIG. 6 depicts a method according to one embodiment of the present invention. Specifically, method 900 of FIG. 6 includes a method for defining and instantiating an undefined portion of a graph. As described herein, method 900 of FIG. 6 enables an undefined portion of a graph to be instantiated on-the-fly (i.e., while defined portions of the graph continue running to provide functions and services). Although primarily depicted and described as being performed serially, at least a portion of the steps of method 900 of FIG. 6 may be performed contemporaneously, or in a different order than depicted and described with respect to FIG. 6. The method 900 begins at step 602 and proceeds to step 604.

At step 604, an incomplete graph is generated. The incomplete graph is generated by running one or more definition files through an execution engine. The incomplete graph includes defined portions and undefined portions. A defined portion of the incomplete graph includes defined states and state transitions, and tokens may traverse the defined portion of the graph to execute one or more functions. An undefined portion of the incomplete graph does not include any defined states and, as such, when a token encounters an undefined portion of the graph, the token is unable continue traversing the graph to provide functions (i.e., there is no defined state to which the token can transition in order to provide a function).

At step 606, the incomplete graph is run (i.e., the software is operating and one or more tokens traverse the defined portions of the graph to provide one or more defined functions supported by the defined portion of the graph). At step 608, a determination is made as to whether an undefined portion of the graph is detected. The undefined portion of the graph is detected by a token (or tokens) as the token traverses the incomplete graph. If an undefined portion of the graph is not detected, method 600 returns to step 606 (i.e., the tokens continue to traverse the graph until encountering an undefined portion of the graph). In an undefined portion of the graph is detected, method 600 proceeds to step 610.

At step 610, the token (or tokens) at the undefined portion of the graph is suspended. The other tokens of the graph may continue to run (unless one or more of those tokens encounter the same undefined portion of the graph or a different undefined portion of the graph). In other words, defined functions of the graph may continue to operate while any undefined functions of the graph are dynamically defined and instantiated on-the-fly in real time. Thus, the present invention enables undefined functions of the graph to be defined and instantiated without impacting defined functions of the graph (i.e., without taking the system down or switching system functions to redundant hardware while undefined functions of the graph are defined).

At step 612, information is obtained. The information is obtained by the execution engine. The information may be obtained locally (e.g., reading information maintained on the local system on which the execution engine is implemented) and/or remotely (e.g., information maintained on other systems that is retrieved by the system on which the execution engine is implemented, e.g., information running on the network). The information may includes the definition of the states in the new graph, the set of correspondence states, those that are in both the old and the new graph, a state in the old graph and the corresponding state in the new graph, and like information, as well as various combinations thereof.

At step 614, a new graph portion is generated. The new graph portion is generated using the obtained information. In one embodiment, the new graph portion may be generated using information associated with one or more of the defined portion(s) of the graph. In one such embodiment, for example, the new graph portion may be generated using information associated with the defined portion of the graph traversed by the token before the token encountered the undefined portion that is now being defined. In one embodiment, the new graph portion is generated by creating or updating one or more definition files, and processing the definition file(s) to generate the new graph portion.

At step 616, the new graph portion is read into the graph. In one embodiment, the new graph portion may replace the state at which the undefined portion of the graph was detected. In one embodiment, the new graph portion may provide one or more state transitions, such that the suspended token(s) may proceed from the state in which the token(s) was suspended to one or more additional states defined in the new graph portion (or at least to loop at the state in which the token(s) was suspended, where no additional states are added). At step 618, the suspended token(s) is released. The suspended token continues to traverse the graph, including any previously defined portions of the graph, as well as the new graph portion.

At step 620, a determination is made as to whether the graph is fully defined. In one embodiment, the determination is made as to whether the graph is fully defined may be omitted. In this embodiment, the execution engine continues to monitor for a determination that an undefined portion of the graph is detected (i.e., since the execution engine may or may not know whether or not the graph is fully defined or still has undefined portions). If the graph is not fully defined, method 600 returns to step 606, at which point the incomplete graph continues running, with tokens traversing the graph to execute various defined functions. If the graph is fully defined, method 600 proceeds to step 622, where method 600 ends.

Therefore, since the present invention enables a software application to be deployed in stages (e.g., with an initial set of functions being supported at the time of deployment and additional functions being defined and instantiated on the software application as needed), the present invention thereby reduces the initial costs of deploying the software application and delaying the costs of deploying additional functions and services. In other words, for a system targeted to support numerous functions, a portion of the functions may be made available to customers, with the remaining functions being undefined at the time of deployment and being defined and instantiated within the software application later, as needed.

Thus, since control is explicit and data is explicit, an undefined region of an instantiated graph can be isolated from remaining portions of that graph, thereby enabling the execution engine to restrict the flow of tokens into the undefined portion of the graph while the undefined portion of the graph is dynamically defined and instantiated on-the-fly. By isolating the undefined portion of the graph, computations in the other portions of the graph may continue to proceed while the undefined portion of the graph is defined and instantiated. Thus, since control over the undefined portion of the graph is so explicit, the undefined portion of the graph may be defined and instantiated in a manner that obviates the need to perform many functions typically required to be performed during software deployments, such as monitoring what is on the stack, monitoring what is on the heap, determining what is invalidated and where it is invalidated (e.g., how far down the stack), and the like.

Furthermore, since the present invention enables software of a system to be defined and instantiated in place, i.e., without switching to a redundant system or taking the system down during the upgrade, the present invention significantly reduces the number of protection elements required to protect functions provided by the system. For example, instead of deploying two pieces of hardware for each function that requires protection, the present invention enables one additional piece of hardware to be deployed to support multiple functions (i.e., the one additional piece of hardware may be oversubscribed), thereby reducing the amount of hardware that must be deployed for a system and, thus, reducing the cost of deploying that system.

For example, for a system currently supporting nine functions but intended to eventually support more than nine functions, since the present invention enables one (or two, or three, and so on) function to be defined and instantiated while the nine existing functions continue to operate, rather than requiring additional redundant hardware sufficient to support all ten functions when only one function is being defined and instantiated, additional hardware sufficient to support only a subset of the ten functions may be required. Thus, for example, the system may be deployed with additional hardware sufficient to support one or two functions (e.g., for use during upgrades, or in case of a failure condition in which one or two functions need to be switched to the redundant hardware).

Figure 7:
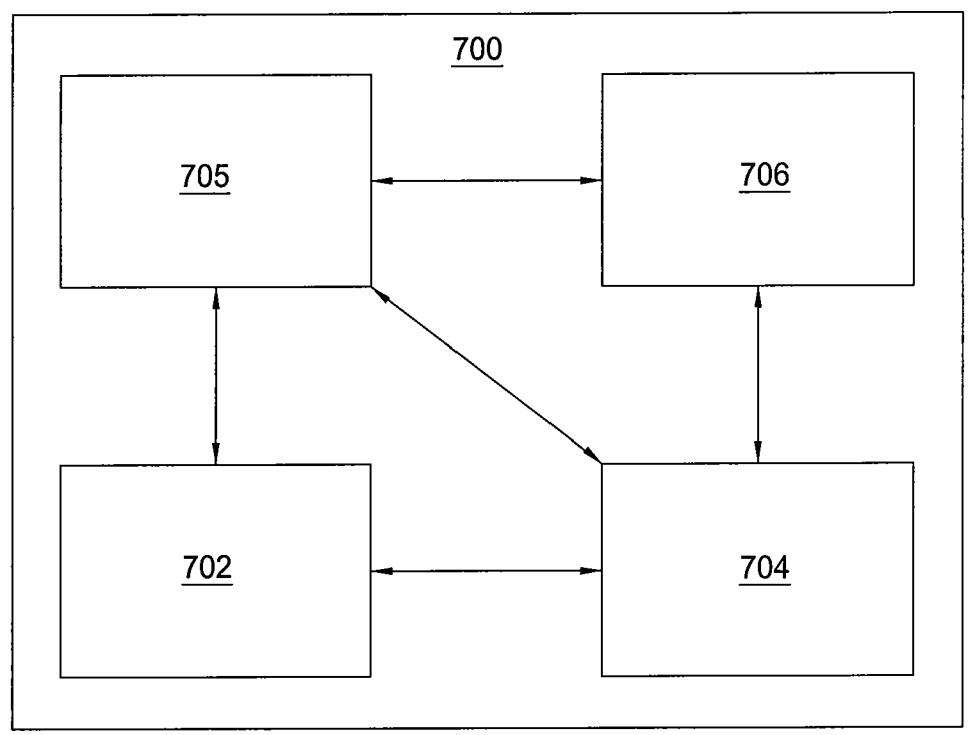
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), an execution engine 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present execution engine process 705 can be loaded into memory 704 and executed by processor 702 to implement the functions as discussed above. As such, execution engine process 705 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

Although primarily depicted and described herein with respect to a VoIP call agent, a VoIP call flow graph, and associated VoIP call agent functions of the VoIP call flow graph, the present invention may be used to update software in any application in which the software is represented using a graph language.

Although various embodiments which incorporate the teachings of the present invention have been shown and described in detail herein, those skilled in the art can readily devise many other varied embodiments that still incorporate these teachings.

What is claimed is:

1. A method executed by a processor for dynamically instantiating a portion of a call flow graph having a plurality of states and a plurality of state transitions, comprising:
   executing the graph, wherein the graph comprises a defined portion and an undefined portion, wherein a plurality of tokens traverse the graph executing functions;
   in response to one of the tokens detecting the undefined portion of the graph, suspending the one of the tokens that detected the undefined portion of the graph;
   generating a new portion of the graph for the undefined portion of the graph, said step of generating the new portion of the graph comprising:
      generating at least one definition file for the undefined portion of the graph; and
      executing the at least one definition file to form thereby the new portion of the graph;
   replacing the undefined portion of the graph with the new portion of the graph; and
   releasing the suspended token.

2. The method of claim 1, wherein generating the at least one definition file for the undefined portion of the graph comprises:
   obtaining information adapted for defining the undefined portion of the graph; and
   generating the at least one definition file using the obtained information.

3. The method of claim 2, wherein the information is obtained at least one of locally from a system on which the graph is instantiated and remotely from at least one network element in communication with the system on which the graph is instantiated.

4. The method of claim 1, wherein replacing the undefined portion of the graph with the new portion of the graph comprises:
   reading the new portion of the graph into the graph.

5. The method of claim 1, wherein, upon being released, the released token traverses the new portion of the graph.

6. The method of claim 1, wherein at least one other token traverses the defined portion of the graph at least while the new portion of the graph is defined.

7. An apparatus comprising a processor for dynamically instantiating a portion of a call flow graph having a plurality of states and a plurality of state transitions, the apparatus comprises:
   means for executing the graph, wherein the graph comprises a defined portion and an undefined portion, wherein a plurality of tokens traverse the graph executing functions;
   means for suspending one of the tokens in response to the one of the tokens detecting the undefined portion of the graph;
   means for generating a new portion of the graph for the undefined portion of the graph, said means for generating the new portion of the graph comprising:
      means for generating at least one definition file for the undefined portion of the graph; and
      means for executing the at least one definition file to form thereby the new portion of the graph;
   means for replacing the undefined portion of the graph with the new portion of the graph; and
   means for releasing the suspended token.

8. The apparatus of claim 7, wherein the means for generating the at least one definition file for the undefined portion of the graph comprises:
   means for obtaining information adapted for defining the undefined portion of the graph; and
   means for generating the at least one definition file using the obtained information.

9. The apparatus of claim 8, wherein the information is obtained at least one of locally from a system on which the graph is instantiated and remotely from at least one network element in communication with the system on which the graph is instantiated.

10. The apparatus of claim 7, wherein the means for replacing the undefined portion of the graph with the new portion of the graph comprises:
   means for reading the new portion of the graph into the graph.

11. The apparatus of claim 7, wherein, upon being released, the released token traverses the new portion of the graph.

12. The apparatus of claim 7, wherein at least one other token traverses the defined portion of the graph at least while the new portion of the graph is defined.

13. A non-transitory computer-readable medium storing a software program that, when executed by a computer, causes the computer to perform a method for dynamically instantiating a portion of a call flow graph having a plurality of states and a plurality of state transitions, comprising:
   executing the graph, wherein the graph comprises a defined portion and an undefined portion, wherein a plurality of tokens traverse the graph executing functions;

in response to one of the tokens detecting the undefined portion of the graph, suspending the one of the tokens that detected the undefined portion of the graph;

generating a new portion of the graph for the undefined portion of the graph, said step of generating the new portion of the graph comprising:

generating at least one definition file for the undefined portion of the graph; and executing the at least one definition file to form thereby the new portion of the graph;

replacing the undefined portion of the graph with the new portion of the graph; and releasing the suspended token.

14. The computer-readable medium of claim 13, wherein generating the at least one definition file for the undefined portion of the graph comprises:

obtaining information adapted for defining the undefined portion of the graph; and generating the at least one definition file using the obtained information.

15. The computer-readable medium of claim 13, wherein replacing the undefined portion of the graph with the new portion of the graph comprises:

reading the new portion of the graph into the graph.

16. The computer-readable medium of claim 13, wherein, upon being released, the released token traverses the new portion of the graph.

17. The computer-readable medium of claim 13, wherein at least one other token traverses the defined portion of the graph at least while the new portion of the graph is defined.

* * * * *